July 26, 1955  D. M. KITTERMAN  2,713,988
DRAWING VALVE FOR LIQUID CONTAINERS
Filed April 27, 1953
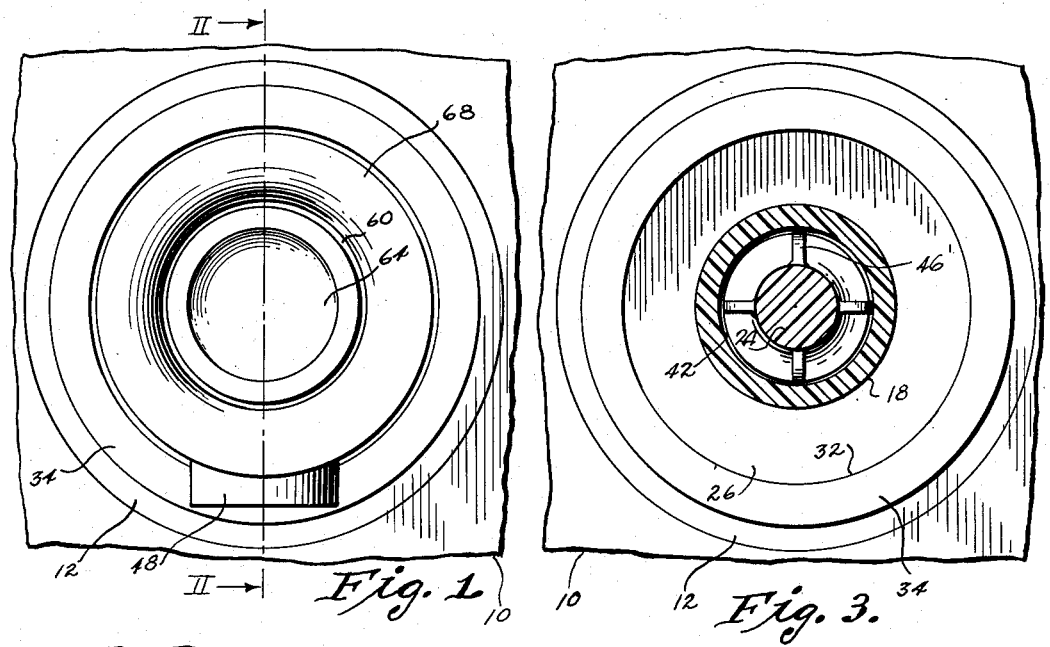
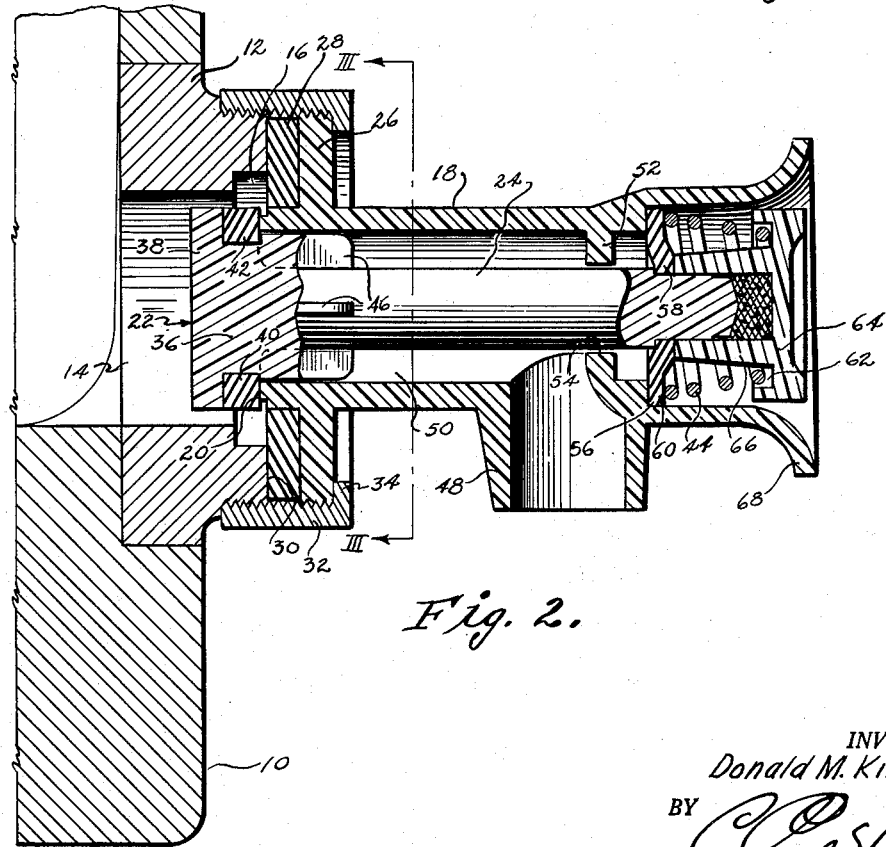
INVENTOR.
Donald M. Kitterman
BY
ATTORNEY.

United States Patent Office 2,713,988
Patented July 26, 1955

2,713,988

DRAWING VALVE FOR LIQUID CONTAINERS

Donald M. Kitterman, Kansas City, Kans.

Application April 27, 1953, Serial No. 351,068

1 Claim. (Cl. 251—322)

This invention relates to valve structure and particularly to a drawing valve for liquid containers, the primary object being to provide an efficient, yet inexpensive valve that is adapted for detachable mounting on a liquid container, that is capable of permitting the maintenance of sanitary conditions and which may be disposed of as desired upon emptying of the container to which the same is attached.

It is the most important object of the present invention to provide closure means wherein the seat thereof and the valve itself are disposed within the container or within the bilge of the latter so that the flow of liquid from the container is stopped at the innermost end of the tubular valve body.

Another important object of this invention is to provide a valve assembly of the character just above set forth, wherein the means for actuating the same manually is disposed exteriorly of that part of the valve body through which the liquid from the container flows, conveniently accessible to the operator and in a position where the liquid emanating from the container will not become contaminated by virtue of the action of the operator actuating the valve.

Another object hereof is to provide a valve assembly having an elongated stem with the valve thereof mounted on one end of the stem and a finger-actuating knob secured to its opposite end, the valve body within which the reciprocable valve structure is mounted being sealed off at both ends thereof so that when the valve is moved to an open position, the liquid is confined to a path of travel through a discharge opening and cannot escape past the outermost end of the valve.

Other objects include the way in which the valve stem is guided within the tubular body; the manner of constructing the entire valve attachment for easy manufacture and assembly; the way in which a flexible closure is provided at the outermost end of the valve stem and held in place by a spring exteriorly of the fluid passageway of the valve body, which spring also normally maintains the valve closed; and other important objects including many details of construction all of which will be made clear as the following specification progresses.

In the drawing:

Figure 1 is a front, elevational view of a drawing valve for liquid containers made pursuant to the present invention.

Fig. 2 is a vertical, cross-sectional view taken on line II—II of Fig. 1; and

Fig. 3 is a transverse, cross-sectional view taken on line III—III of Fig. 2.

The valve assembly hereof is shown in the drawing mounted upon a suitable liquid container broadly designated by the numeral 10, and which container 10 is provided with a bilge or protuberance 12 having an outlet port 14 through which the liquid from container 10 flows, said bilge 12 having a circular, enlarged portion 16 adjacent its outermost end. The valve assembly, which may be detachable, mounted upon the container 10 and particularly upon the bilge 12 thereof, includes an elongated, tubular valve body broadly designated by the numeral 18.

The innermost end of the valve body 18 presents a seat 20 for a valve 22 that is mounted on an elongated stem 24 reciprocably carried by the valve body 18. An annular, outturned flange 26 integral with the valve body 18 and adjacent its innermost end or seat 20, engages a washer-like seal 28 of resilient material that surrounds the valve body 18 and engages the outermost annular edge 30 of the bilge 12. The bilge or protuberance 12 is externally threaded to receive a cup-shaped coupling 32 having an inturned flange 34 that bears against the outermost face of the flange 26. When the coupling 32 is mounted upon the protuberance 12, the resilient seal or gasket 28 is clamped tightly between the flange 26 and the edge 30, thereby obviating any leakage of the liquid from container 10.

The valve 22 consists of a head 36 having a disc 38 on the innermost end thereof and an annular shoulder 40 around which is disposed a ring 42 of resilient material that is normally held clamped between the disc 38 and the seat 20 by a frusto-conical spring 44 surrounding the valve stem 24 at its outermost end. Guide means for the valve stem 24 takes the form of a plurality of elongated, radial vanes 46 within the valve body 18 and extending outwardly from the shoulder 40.

A short spout 48 integral with the body 18 and depending therefrom, presents a discharge opening communicating with bore 50 for valve body 18, and a partition 52 within bore 50 adjacent the spout 48 has a guide opening 54 therein that slidably receives the valve stem 24.

Outwardly facing shoulders 56 and 58 on valve body 18 and on valve stem 24 respectively, receive closure means 60 in the nature of a diaphragm or flexible plate that surrounds the valve stem 24 adjacent its outermost end. The spring 44 bears at one end thereof against the closure means 60 and at its opposite end within a cavity 62 forming a part of a disc-shaped finger-engaging knob 64. Knob 64 has a tubular extension 66 that partially surrounds the valve stem 24 and is affixed thereto by press fit and/or the use of a suitable bonding material. The outermost end of the body 18 is flared outwardly as at 68 for rendering the knob 64 readily accessible and for presenting a finger-engaging portion as the operator places his thumb on the knob 64 and presses inwardly thereon against the action of spring 44 to open the valve 22.

It is clear from the foregoing that the spring 44 performs two functions, namely, that of holding the ring 42 in sealing relationship with the seal 20, and secondly, that of holding the sealing means or closure 60, tightly against the outturned flange of the valve body 18. When the operator grasps the outturned, flared portion 68 of the body 18 and presses inwardly upon the knob 64, he compresses the spring 44 as the stem 24 is shifted inwardly and as the spring 44 is compressed the seal 60 is in turn pressed even more tightly against the flange 56 to prevent escape of the fluid past the closure means 60.

It is clear also, that when the knob 64 is pressed in place upon the valve stem 24, the innermost end of the tubular portion 66 will come to bear upon the closure means 60 and clamp the latter tightly against the flange 58 of valve stem 24. The opening 54 within the partition 52 and the wings 46 on the stem 44 cooperate to guide the stem 24 in its reciprocable movement along the longitudinal axis of the valve body 18. As soon as the seal 42 is moved away from the seat 20, the liquid will readily flow from the container 10 through the outlet port 14, past the enlarged portion 16 thereof and into the tubular valve body 18 for discharge through the spout 48. The radial wings 46 do not hamper the free flow of liquid when the valve 22 is open. When the container 10 has been emptied of its contents, the entire valve assembly may be removed from the bilge 12 by loosening the coupling 32 and the assembly cleaned or discarded.

It is a simple matter in assembling the valve to insert the stem 24 in the position shown in Fig. 2 of the drawing, place the closure means 60 thereon, thereupon mounting the spring 44 and finally pressing the knob 64 into place upon the stem 24 until it comes into engagement with the flexible plate 60.

Having thus described the invention what is claimed as new and desired to be secured by Letters Patent is:

In a valve assembly for a liquid container having an elongated tubular body provided with a longitudinal bore, a discharge opening communicating with the bore intermediate its ends, an elongated, reciprocable stem within the bore, a valve seat on the body at one end of the bore, and a valve head on one end of the stem adapted to engage said seat for closing said one end of the bore when the stem is fully reciprocated toward the opposite end of the bore, means for closing the bore between the discharge opening and said opposite end of the bore comprising a shoulder on said stem facing the end of the stem adjacent said opposite end of the bore; a resilient, annular disc on the stem and disposed against said shoulder; a knob having a sleeve portion rigidly mounted on the stem and tightly engaging a central portion of the disc to hold the latter rigidly against the shoulder, said sleeve being provided with an outturned flange at the extremity thereof remote from the disc; an internal shoulder in the bore between the discharge opening and said opposite end of the bore and facing the latter, said last-mentioned shoulder being adapted to receive an outer portion of the disc; and a spring compressed between the flange on the sleeve and said outer portion of the disc to bias the latter into tight engagement with said shoulder of the bore.

References Cited in the file of this patent

UNITED STATES PATENTS

| | | |
|---|---|---|
| 950,801 | Barr | Mar. 1, 1910 |
| 987,633 | Long | Mar. 21, 1911 |
| 1,805,537 | Allan | May 19, 1931 |
| 1,888,130 | Huffman | Nov. 15, 1932 |
| 2,093,678 | Jacobsson | Sept. 21, 1937 |
| 2,197,352 | Terkel | Apr. 16, 1940 |
| 2,628,062 | Weber | Feb. 10, 1953 |